(12) United States Patent
Taylor et al.

(10) Patent No.: US 11,242,179 B2
(45) Date of Patent: Feb. 8, 2022

(54) UNITARY, TAMPER-EVIDENT PLUG WITH SMOOTH POURING SPOUT

(71) Applicant: RIEKE LLC, Auborn, IN (US)

(72) Inventors: Dale W. Taylor, Hamilton, IN (US); Anthony Angelozzi, Fort Wayne, IN (US); Thomas P. Kasting, Fort Wayne, IN (US)

(73) Assignee: RIEKE LLC, Auborn, IN (US)

( * ) Notice: Subject to any disclaimer, the term of this patent is extended or adjusted under 35 U.S.C. 154(b) by 0 days.

(21) Appl. No.: 16/690,719

(22) Filed: Nov. 21, 2019

(65) Prior Publication Data

US 2020/0140154 A1    May 7, 2020

Related U.S. Application Data

(63) Continuation of application No. PCT/US2019/058270, filed on Oct. 28, 2019.

(60) Provisional application No. 62/750,934, filed on Oct. 26, 2018, provisional application No. 62/851,262, filed on May 22, 2019.

(51) Int. Cl.
| | |
|---|---|
| *B65D 47/08* | (2006.01) |
| *B65D 50/04* | (2006.01) |
| *B29L 31/56* | (2006.01) |
| *B65D 51/20* | (2006.01) |

(52) U.S. Cl.
CPC ....... *B65D 47/0847* (2013.01); *B65D 50/045* (2013.01); *B29L 2031/565* (2013.01); *B65D 51/20* (2013.01); *B65D 2251/105* (2013.01); *B65D 2251/20* (2013.01)

(58) Field of Classification Search
CPC .. B65D 43/169; B65D 43/164; B65D 43/162; B65D 43/161; B65D 43/16; B65D 47/0847; B65D 50/045; B65D 2251/20; B65D 2251/105; B65D 51/20; B65D 47/0823; B65D 47/0838; B65D 47/103; B65D 25/42; B65D 47/043; B29L 2031/565
See application file for complete search history.

(56) References Cited

U.S. PATENT DOCUMENTS

| | | | |
|---|---|---|---|
| 3,135,411 A | | 6/1964 | Osborne |
| 3,737,066 A | * | 6/1973 | Ames ..................... B65D 15/08 |
| | | | 220/350 |
| 3,910,453 A | * | 10/1975 | Kneusel ............... B65D 17/506 |
| | | | 220/260 |

(Continued)

FOREIGN PATENT DOCUMENTS

WO    WO2016014033    1/2016

OTHER PUBLICATIONS

International Searching Authority, US Patent Office, International Search Report and Written Opinion for PCT/US2019/058270, 12 pages, dated Jan. 6, 2020.

*Primary Examiner* — Kareen K Thomas
(74) *Attorney, Agent, or Firm* — McDonald Hopkins LLC

(57) ABSTRACT

A resealable, tamper-evident, low cost plug for an edible oil (or other foodstuffs) container is contemplated. The plug includes a single-piece, hinged construction with the base panel having a removable diaphragm revealing an opening that is sealed by structure provided on the hinged panel. Smooth pouring features may also be incorporated within and/or beneath the opening.

11 Claims, 9 Drawing Sheets

(56) References Cited

U.S. PATENT DOCUMENTS

| | | | |
|---|---|---|---|
| 4,518,094 A * | 5/1985 | Kodman | B65D 47/0895 |
| | | | 220/254.3 |
| 4,747,498 A * | 5/1988 | Gach | B65D 47/103 |
| | | | 215/232 |
| 4,815,618 A | 3/1989 | Gach | |
| 5,145,646 A * | 9/1992 | Tyranski | B01L 3/50825 |
| | | | 215/235 |
| 5,762,216 A | 6/1998 | Takeuchi | |
| 7,017,735 B2 | 3/2006 | Carlson | |
| 7,607,551 B2 | 10/2009 | Coughlin | |
| 7,823,723 B2 | 11/2010 | Anthony | |
| 7,870,979 B2 | 1/2011 | Maki | |
| 8,113,374 B2 | 2/2012 | Steiger | |
| 8,523,837 B2 | 9/2013 | Wiggins | |
| 8,678,215 B2 | 3/2014 | Steiger | |
| 10,173,816 B2 | 1/2019 | Danks | |
| 2006/0097006 A1 | 5/2006 | Smith | |

* cited by examiner

UNITARY, TAMPER-EVIDENT PLUG WITH SMOOTH POURING SPOUT

CROSS REFERENCE TO RELATED APPLICATIONS

This application is a continuation of International Patent Application No. PCT/US2019/058270 filed on Oct. 28, 2019, which claims priority to United States Provisional Patent Application Ser. No. 62/750,934 filed on Oct. 26, 2018 and 62/851,262 filed on May 22, 2019. Each of these applications are incorporated by reference in their entirety.

TECHNICAL FIELD

The present invention relates to a single piece closure plug with anti-glug features. The closure is low cost and, as such, expected to find particular utility on closures for mass-produced foodstuffs, and particularly those requiring bulk storage and shipping.

BACKGROUND

Low cost plugs are particularly important for use by governments and aid agencies who must ship relatively large on containers used of edible oils and other liquids or pourable foodstuffs. These closures must be easy to manufacture. In terms of their use, single piece, rugged, and resealable closures are most desirable. Further still, a design with a low profile (relative to the surface of the container to which it is affixed) is needed.

A "nutritive" substance delivery container is shown in U.S. Pat. No. 7,823,723, along with similar types of concepts disclosed in U.S. Pat. Nos. 8,523,837 and 7,017,735. Notably, these systems all seem adapted for screw-attachment to bottles and are representative of higher cost closure options.

U.S. Pat. No. 8,113,374 describes a closure and container combination for flowable substances with a hinged cap attached to a base. A frangible center portion can be removed via cooperation of pull ring and teeth, thereby revealing a membrane concealed under and attached beneath the base to seal the container opening.

U.S. Pat. No. 3,135,411 discloses a tubular pouring spout with an integral, flexible diaphragm. This diaphragm includes a lever and pull tab to facilitate the outward removal of the diaphragm so as to expose the spout opening.

None of the foregoing disclosures addresses the specific needs of bulk container shipments. In particular, a low profile seal that can be snap-fit and/or crimped onto a bung or other commonly-sized opening in drums and other large containers is needed. Further, the specific needs of a resealable, anti-glug, and/or low cost and easily manufactured closure are not necessarily addressed in these disclosures.

SUMMARY

A snap or force fitting plug is secured into and/or over the opening of a sanitary container. The plug includes a base panel with a removable diaphragm, as well as hinged panel which folds over and seals the opening created when the diaphragm is removed. In certain embodiments, the hinged panel is biased to an opened or closed position and may also include snap or force fitting abutments to cooperate with one or more corresponding features on the base panel. The base panel may be angled and/or include a ring with optional, inwardly facing anti-glug tabs along its bottom facing (i.e., the facing on the opposite side from where the hinged panel is disposed).

Specific reference is made to the appended claims, drawings, and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DESCRIPTION OF THE DRAWINGS

Operation of the invention may be better understood by reference to the detailed description taken in connection with the following illustrations. These appended drawings form part of this specification, and any information on/in the drawings is both literally encompassed (i.e., the actual stated values) and relatively encompassed (e.g., ratios for respective dimensions of parts). In the same manner, the relative positioning and relationship of the components as shown in these drawings, as well as their function, shape, dimensions, and appearance, may all further inform certain aspects of the invention as if fully rewritten herein. Unless otherwise stated, all dimensions in the drawings are with reference to inches, and any printed information on/in the drawings form part of this written disclosure.

In the drawings and attachments, all of which are incorporated as part of this disclosure:

FIG. 2A is a three dimensional, perspective view of the plug shown in FIG. 1A as it can be installed on a container, while

FIG. 5A is perspective view of one aspect of the inventive plug in the open position before the diaphragm has been removed, while

FIG. 6A is a perspective, sectional, cutaway view of the embodiment of FIG. 5A, while

DETAILED DESCRIPTION

Figure 1A:
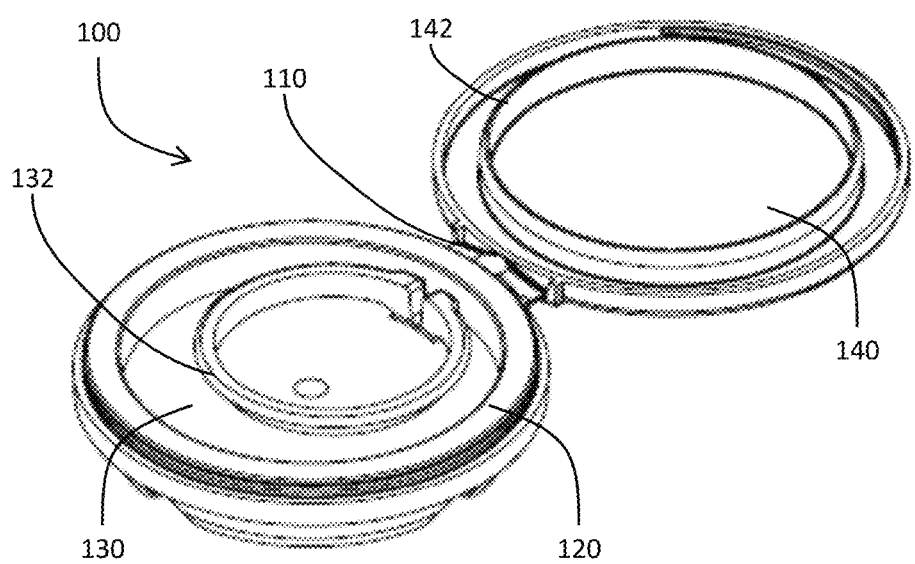
FIG. 1A is a three dimensional, perspective view of one aspect of the inventive plug in the open position before the diaphragm has been removed.

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

References to horizontal and vertical are relative to the drawings and, more specifically, the expectation that industrial drums and containers typically provide an opening along a top facing. Also, references to coupling or attachment in this disclosure are to be understood as encompassing any of the conventional means used in this field. This may take the form of snap- or force fitting of components, although threaded connections, bead-and-groove, and slot- and-flange assemblies could be employed. Adhesive and fasteners could also be used for attachment, although such components must be judiciously selected so as to retain the recyclable nature of the assembly. Further, the term engagement may involve coupling or an abutting relationships, depending upon the context. All of these terms, as well as any implicit or explicit reference to coupling, will should be considered in the context in which it is used, and any perceived ambiguity can potentially be resolved by referring to the drawings.

With reference to FIGS. 1A through 4, closure plug 100 includes a base panel 120 connected to a hinged top or closing panel 140. A hinge 110 connects and facilitates the sealing connection of panels 120, 140. A removable diaphragm 130 includes a pull ring 132. When proper force is applied via pull ring 132, grooved or thinned sections 134 connecting the diaphragm 130 to central portion of base panel 120 allow the diaphragm to be lifted free to create an aperture that serves as a pour spout.

In some embodiments, hinge 110 may be formed from a resilient material to bias the assembly 100 into the closed position. Additionally or alternatively, hinge 110 may include a recess to accept a member, such as a torsion spring, to accomplish a similar end. In any event, hinge 110 facilitates the selective rotation of the hinged panel 140 from an open to closed position relative to the base panel 120. Alternatively the hinge may be a standard living hinge without any biasing action.

A cylindrical skirt 122 extends downwardly below the diaphragm 130 and/or at or near the plane defined when panels 120, 140 are laid out in an opened, horizontal position. At its terminal end, angled section 126 is snap or force fitted into an opening 13 of a container 10. Section 126 may be formed as a single continuous or as a plurality of arcuate portions or tabs along the bottom edge of skirt 122 or as one or plurality of tab-like features. Preferably, the section(s) 126 are positioned along the circumference of the skirt 122 to maintain engagement with the opening/container so as to keep the assembly 100 firmly positioned within the opening (e.g., two, three, four, or more sections 126 can be evenly spaced about the periphery of the opening/skirt 122). In operation, the structure(s) comprising section 126 effectively serve as a plug to close, seal, and retain the assembly 100 within the opening 13.

The shape of section 126 includes an arrow-like tapered or angular ramp at the bottom end expanding radially outward to terminate an engagement ledge or notch. The engagement ledge that transitions along an approximately horizontal line back to the outer facing of skirt 122. In this manner, section 126 is easily slid/inserted into the opening, with the ledge/notch engaging the underside of the opening 13 (i.e., the facing on the internal volume of the container 10) to prevent the assembly 100 from inadvertently slipping out.

In the same manner, an outwardly disposed, annular flange or lip 124 at the top end of the skirt 122 can engage and secure the assembly 100 to an annular ridge 11 formed in the container 10 around the bung or opening. Flange 124 may is positioned above the diaphragm 130 and/or aforementioned plane, and a slot or inverted U-shape may be formed on the underside of flange 124 to accommodate and/or attach to the ridge 11. The slot or U-shape may form a snap fit around the ridge 11 to further secure the assembly 100 to the container 10. The portion of the base 120 where flange 124 is formed may be imparted with a greater sidewall thickness, relative to skirt 122 and/or connection to the diaphragm 130, so as to impart strength and stability to assembly 100.

Figure 2A:
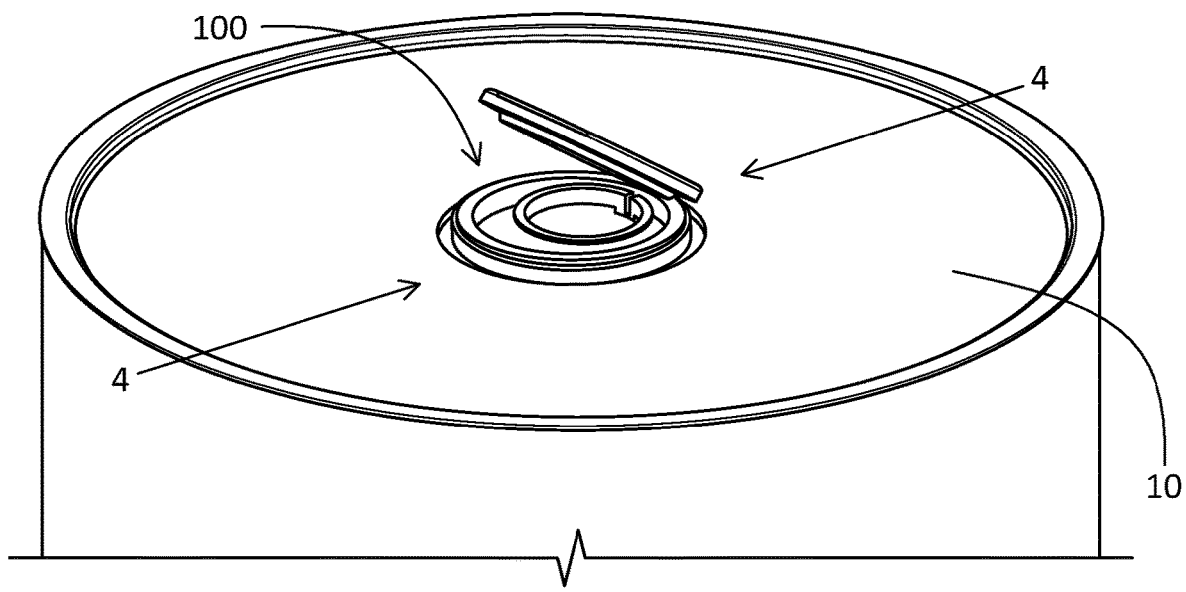
Figure 2B:
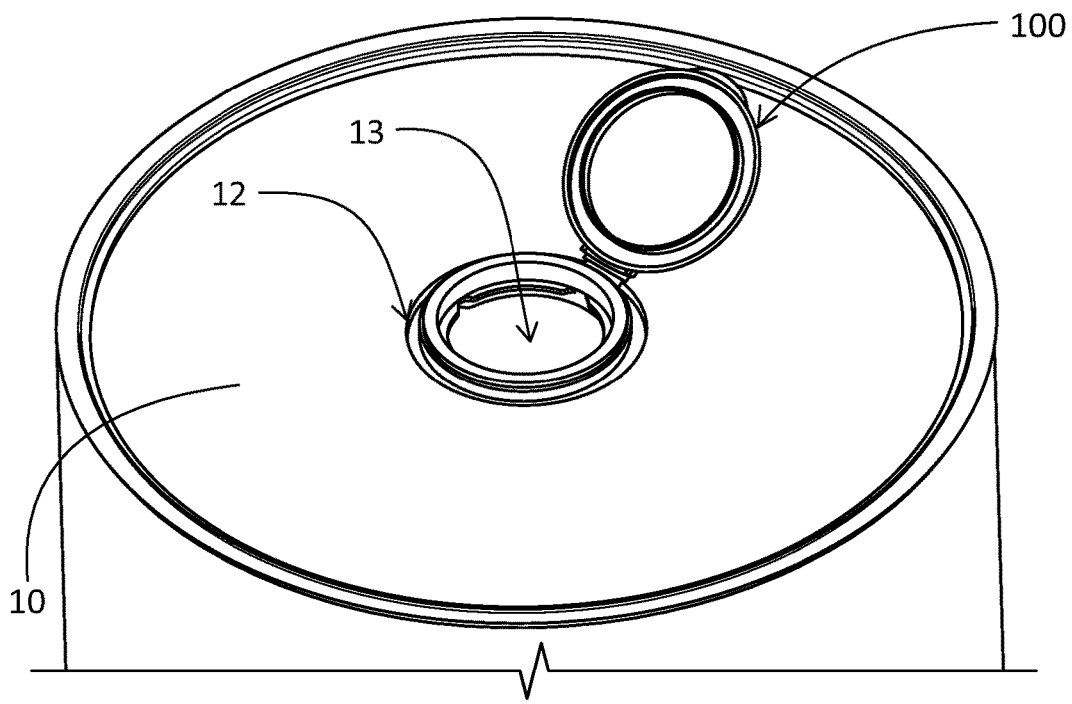
FIG. 2B is a three dimensional perspective view of that same installed plug with the diaphragm removed.
Figure 3:
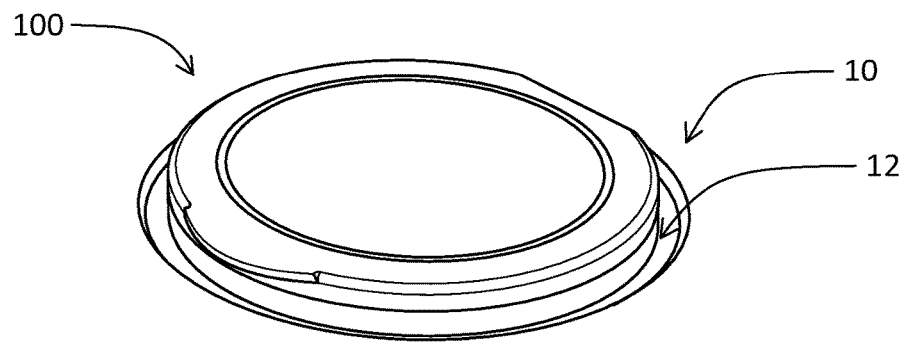
FIG. 3 is an isolated, three dimensional, perspective view of the plug of FIG. 1A, but with the lid snapped closed. In this configuration, the lid seals the opening so that this view is representative of the plug with and without the diaphragm in place.

Overall, this arrangement imparts a hollow, cylindrical, and preferably circular shape to base 120 so as to match and fit to the opening 13 in container 10, with flange 124 and section 126 sealing to the container, ideally without the need for gaskets or other common sealing means (although such structures can be provided on the assembly 100, the base 120, and/or the container 10 at its opening 13/ridge 11). Further, as seen in FIGS. 2B and 3, if the opening 13 in container 10 is formed by metal working procedures that create an annular depression 12 proximate to the opening 13, a substantial portion of assembly 100 can and will reside beneath the planar surface of the container 10. In this manner, assembly 100 presents an extremely low profile and, especially to the extent the bottom panel of the container (not shown) is indented or raised up owing to an annular ride, a series of containers can be stacked vertically without the assembly 100 impeding or presenting problems to such stacking.

Panels 120, 140 will be coupled together in the horizontal position when the assembly 100 is in a closed position. Any portion of the skirt 122 extending above the panel 120 can be curved or taper outwardly so as to form a pouring spout. Further, pull ring 132 (described below) lays flat against the combined plane defined by the panel 120 and diaphragm 130 so as to contain ring 132 entirely beneath the hinge panel 140 in its initial closed position (i.e., before the diaphragm 130 might be removed, as described below). Supporting reinforcement ribs may be positioned at intervals, preferably evenly spaced, above and/or below the panel 120 top and bottom surfaces where the panel 120 connects to the skirt 122. Additional annular flanges may be integrated along the inner and/or outer surfaces of the skirt 122 and/or flange 124 for engagement or reinforcement purposes. Similar reinforcing webs can be formed within the horizontal plane, preferably on the underside of panel 120 to provide strength and facilitate the tearing and removal of diaphragm 130 according to the thinned sections 134 where the diaphragm 130 is integrally formed with and joined to panel 120 and/or skirt 122.

Diaphragm 130 is disposed within the planar surface of panel 120, either centered or disposed proximate to or even in contact with an edge of the outermost circumference. If near the edge, the diaphragm may preferably be located at the lowest axial elevation when an angled panel 120 is provided relative to the skirt 122 (i.e., the diaphragm is formed at or just above the junction where the tapered sections 126 are integrated with the skirt 122), as well as positioned to accommodate the pull ring 132 (i.e., the diaphragm must be low enough to provide clearance for the ring 132 to be enclosed between the diaphragm 130/base 120 and the top panel 140 when it is in a closed position.

Figure 1B:
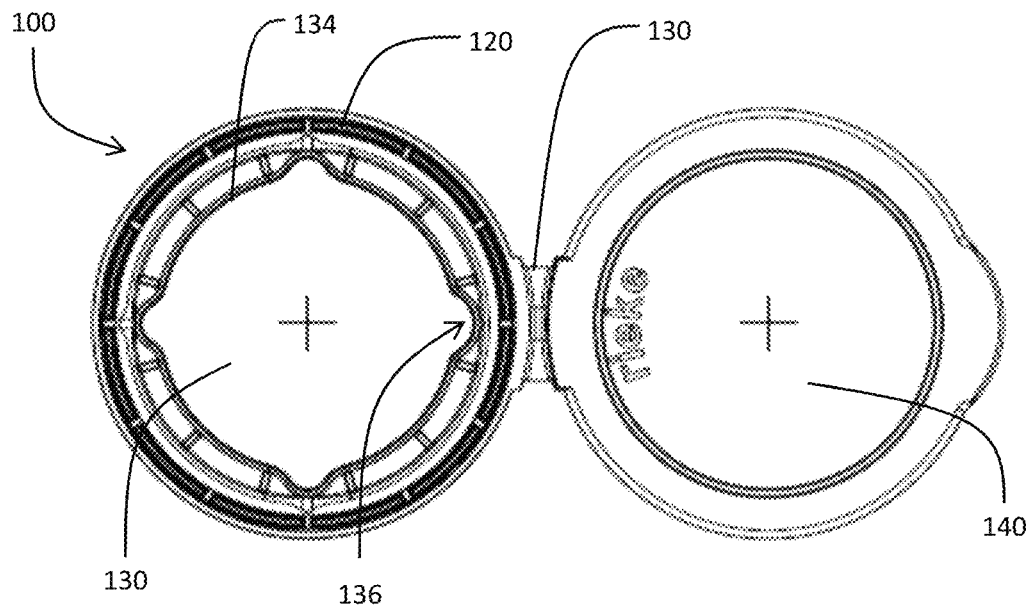
FIG. 1B is bottom plan view.
Figure 1C:
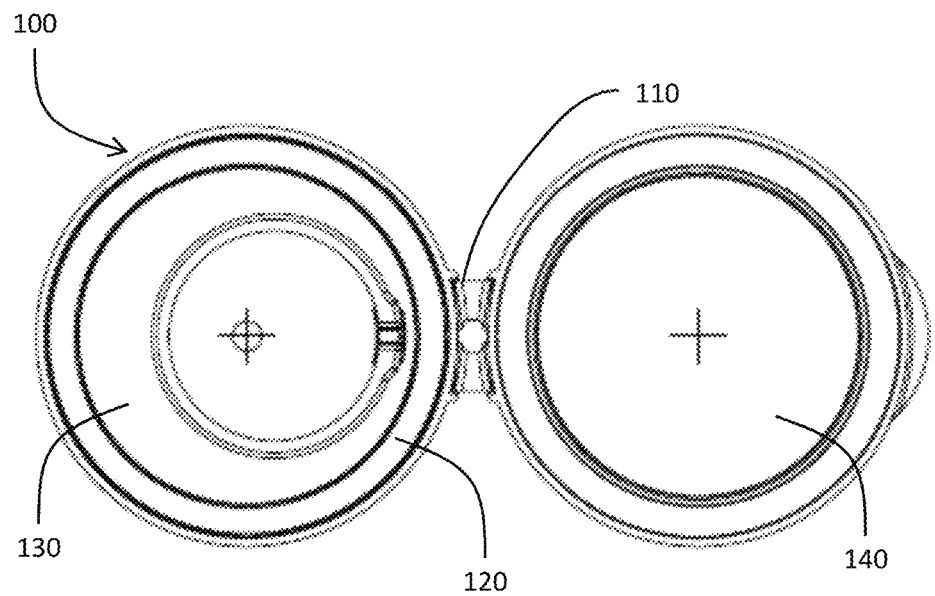
FIG. 1C is a top plan view.
Figure 1D:
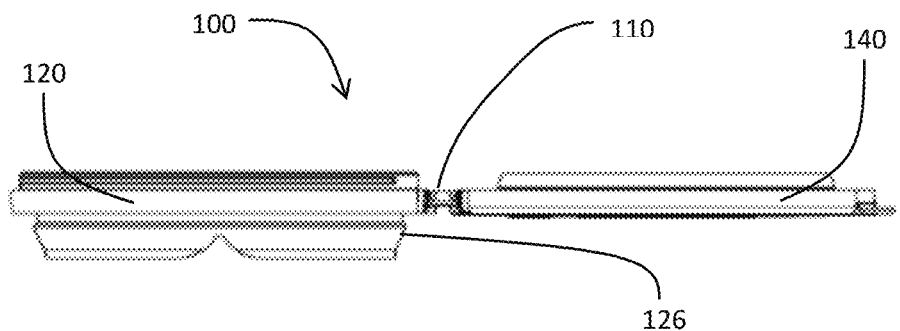
FIG. 1D is a side plan view, all of that same plug.
Figure 7:
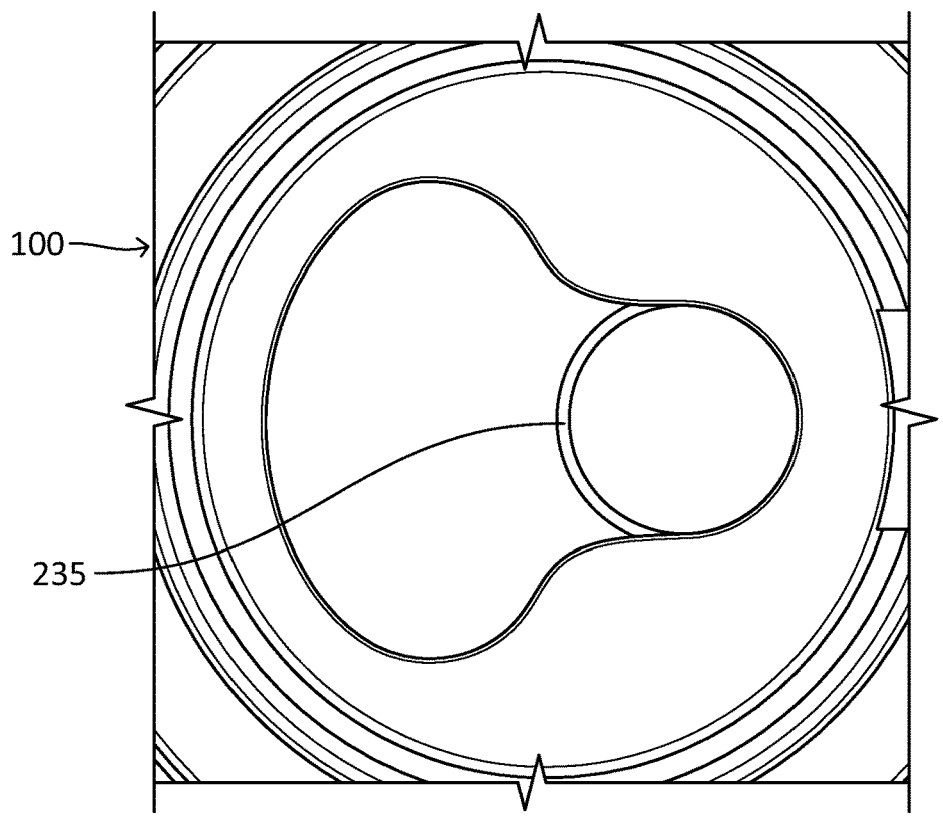
FIG. 7 is a top plan, sectional view of the base panel of the embodiment in FIG. 5B.
Figure 8:
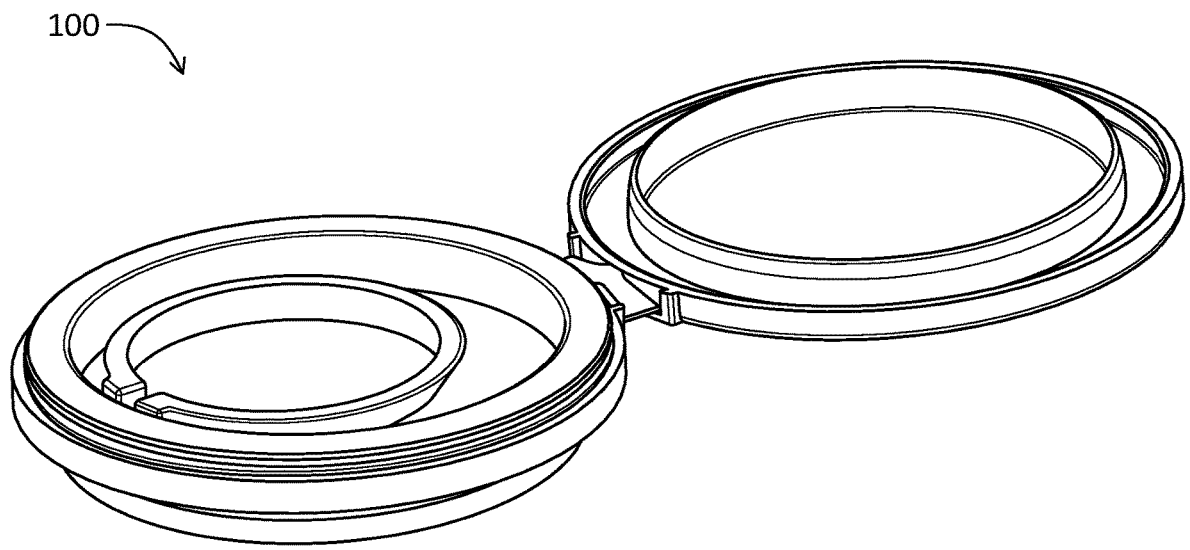
FIG. 8 is a perspective view of a second aspect of the inventive plug in the open position before the diaphragm has been removed.
Figure 9:
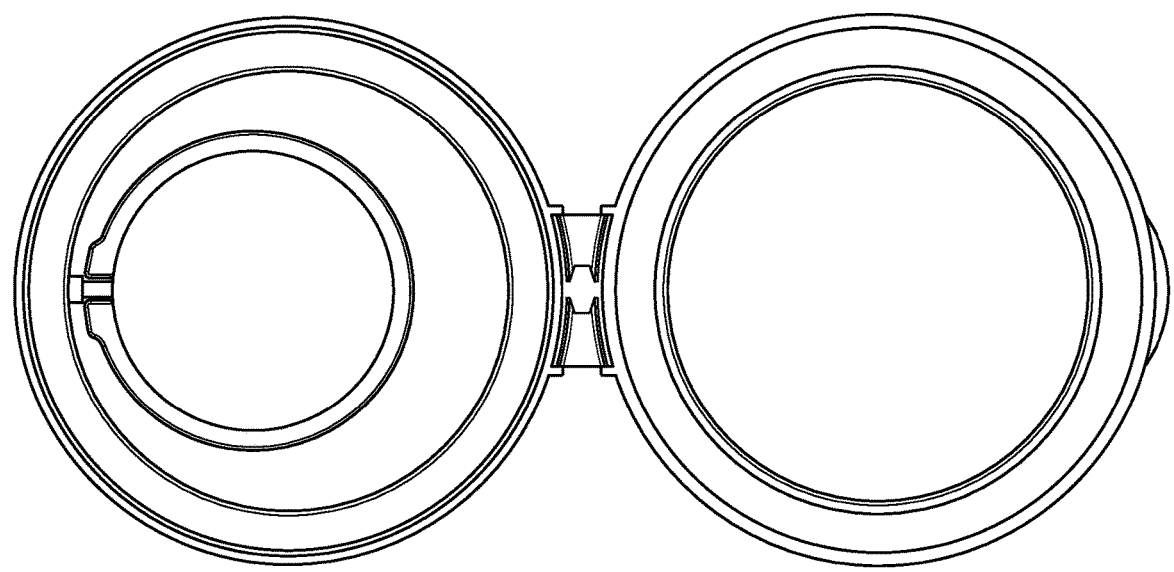
FIG. 9 is a top plan view of the embodiment of FIG. 8.
Figure 10:
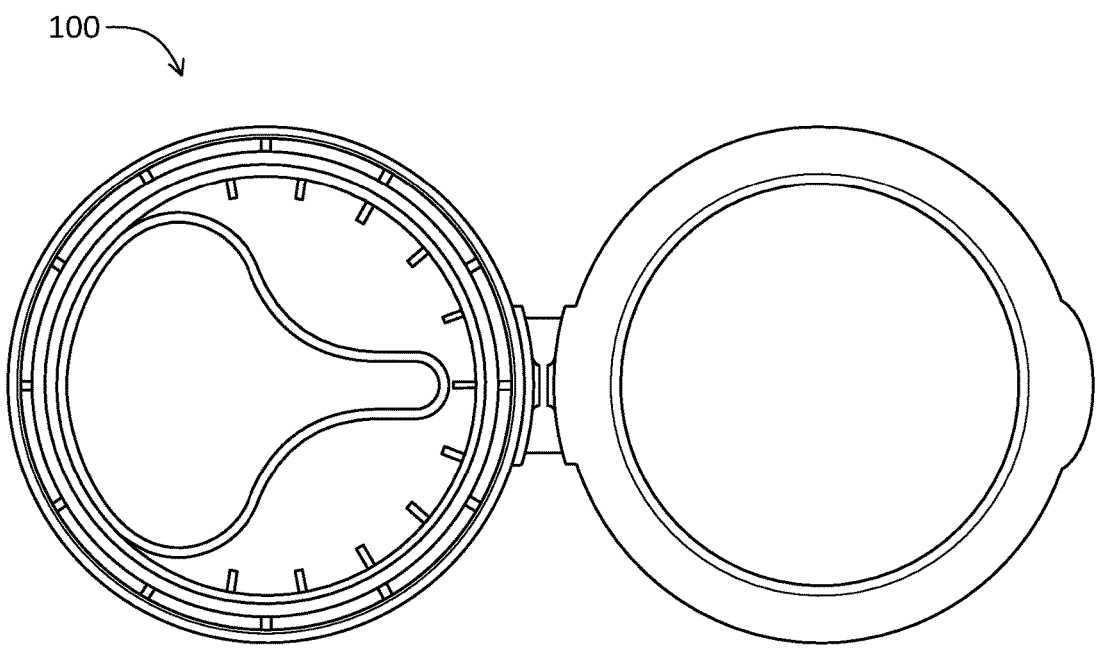
FIG. 10 is a bottom plan view of the embodiment of FIG. 8.

Diaphragm may include a pull ring 132 or other grasping member. A continuous groove or thinned section 134 on the top and/or bottom facing(s) of panel 120 delineates the shape of the aperture created by pulling the ring 132 away from the panel 120. A preferred shape is a circle with one or a plurality (preferably 2, 3, 4, or 5) arcuate sections 136, expanding beyond the radius of that circle, as seen in FIG. 1B. Other shapes include polygons (e.g., triangle, quadrilateral, pentagon, hexagon, etc.), C-shaped arcs, ovals, circles, and the like, as well as those shown in FIGS. 7 and 10 (where an enlarged curved section forms the pour spout and possesses a larger radius/diameter in comparison to a separately curved section formed as part of the opening). When present, arcuate protrusions 136 (or acute angled wedges, if a linear form such as a triangle are used) form a preferred flow channel for fluid dispensed through the assembly (e.g., by pouring).

In some embodiments, the groove/thinned section does not necessarily need to be continuous, so long as the diaphragm section can be easily lifted out and separated. Perforations can also be formed in order to define section 134. A combination of perforations and grooves could also be used. In any event, the diaphragm should be of a construction that ensures the base 120/diaphragm 130 is sealed and impervious to leakage. In one embodiment, panel 140 may be urged into a closed position and/or designed to engage the base 120 so as to assist in this sealing function.

When created by removing the diaphragm 130, the resulting aperture defined by the base 120 (and shown in FIG. 2B) serves as a pouring spout to dispense fluid out of the container. In some embodiments, an anti-glug member can be formed in or along the underside of the panel 120 proximate to the aperture (see assembly 200). Although not shown, a series of tabs or ears may be formed on the bottom-most facing to further enhance the anti-glug feature. These tabs may be disposed at an inward angle around a portion or substantially all of the arc or circumference defined by member 134. When provided, the tabs may be orthogonal to or inwardly angled. The tabs may also be spaced apart.

An engagement lip 142 is formed on the facing of the top panel 140 that comes into contact with the base panel 120 when the assembly is closed. The engagement lip 142 may conform to some or all of the aperture created when the diaphragm 130 is removed by way of engagement features at the interface between lip 142 and skirt 122/flange 124. Lip 142 has an axial height (relative to line A-A) to ensure there is sufficient offset between the diaphragm 130 and the panel 140.

Additionally or alternatively, a protrusion or annular cylinder 144 may be formed on the facing of panel 140 that comes into contact with the outer periphery of the panel 120 at flange 124 when the assembly 100 is closed. This cylinder 144 may snap-fit or otherwise engage and disengage a cooperating feature on the flange 124 so as to allow for selective opening and closing of the container 10. Cylinder 144 need not be continuous and, instead, could be provided as one or more arcuate sections or tabs. Flange 124 may be provided with an outer annular ledge 125 so that the cylinder 144 abuts and rests thereon, so as to allow the assembly 100 to bear heavier loads along its top facing surface. When a ledge 125 is present, the section of flange 124 directly below the ledge 125 can be designed to rest upon the top panel of the container 10 so as to further enhance the axial loading capacity of the assembly 100.

In view of the closing capabilities of lip 142 and/or cylinder 144, the freshness of the edible oil or other foodstuffs enclosed by the assembly is preserved. Further, when the hinge 110 includes a butterfly biasing member as shown, it may be possible to predispose the assembly toward being sealed.

In FIGS. 5A-10, alternative assemblies 200 are contemplated. Many of the features are nearly identical to those described above, including the structure, function/design considerations, and ancillary components of hinge 110, base 120, diaphragm 130, and cover panel.

In addition to showing a modified aperture (with a larger radius pour spout section) after the diaphragm 130 is removed, here an anti-glug divider 235 is provided. The divider 235 helps separate air and liquid flow when the assembly 100 is tilted into a dispensing/pouring position. The larger radius of the pour spout section should also assist flow in this regard.

Figure 4:
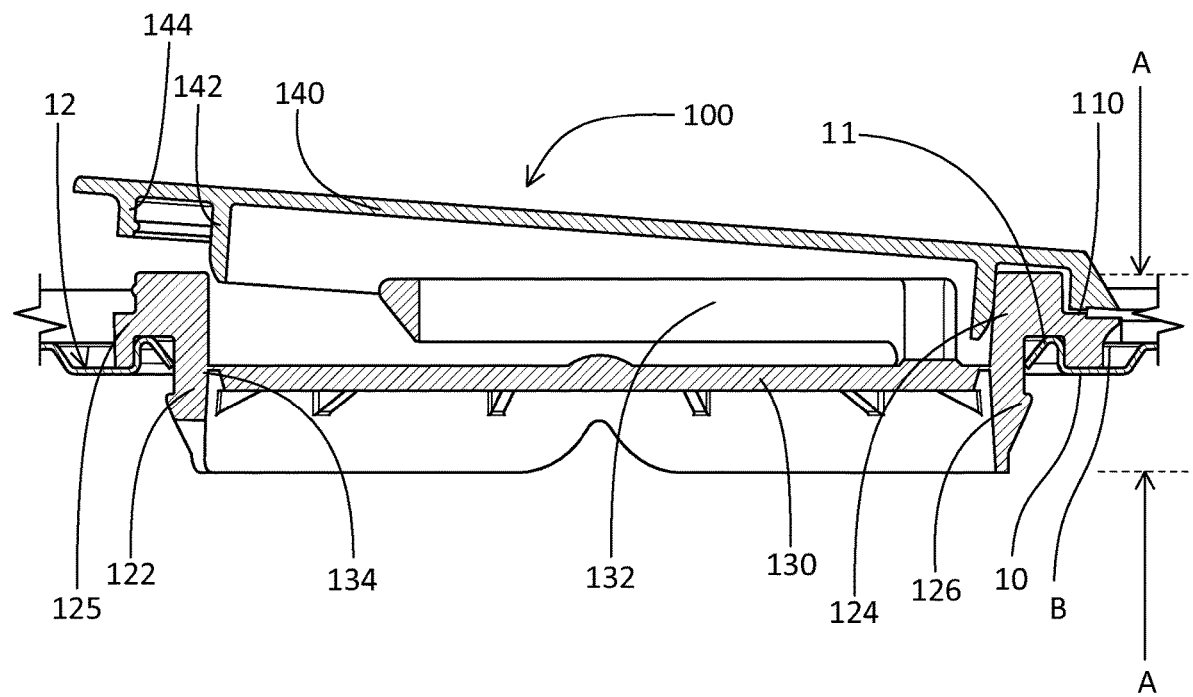
FIG. 4 is a cross sectional side view of the plug as shown in FIG. 2A, as taken along the line 4-4 in FIG. 2A.
Figure 5A:
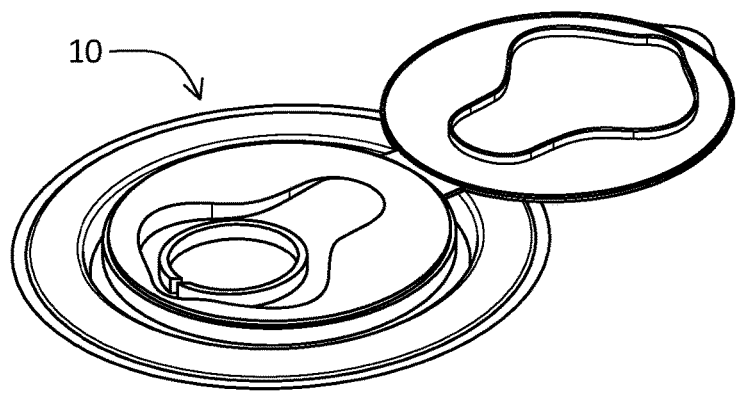
Figure 5B:
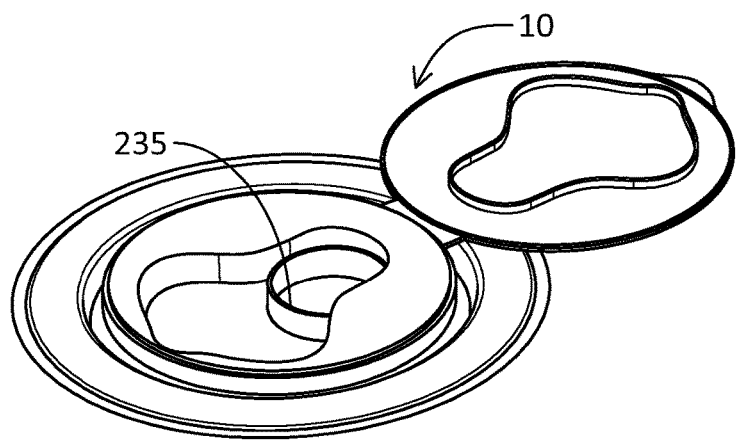
FIG. 5B is an identical view but with the diaphragm removed.
Figure 6A:
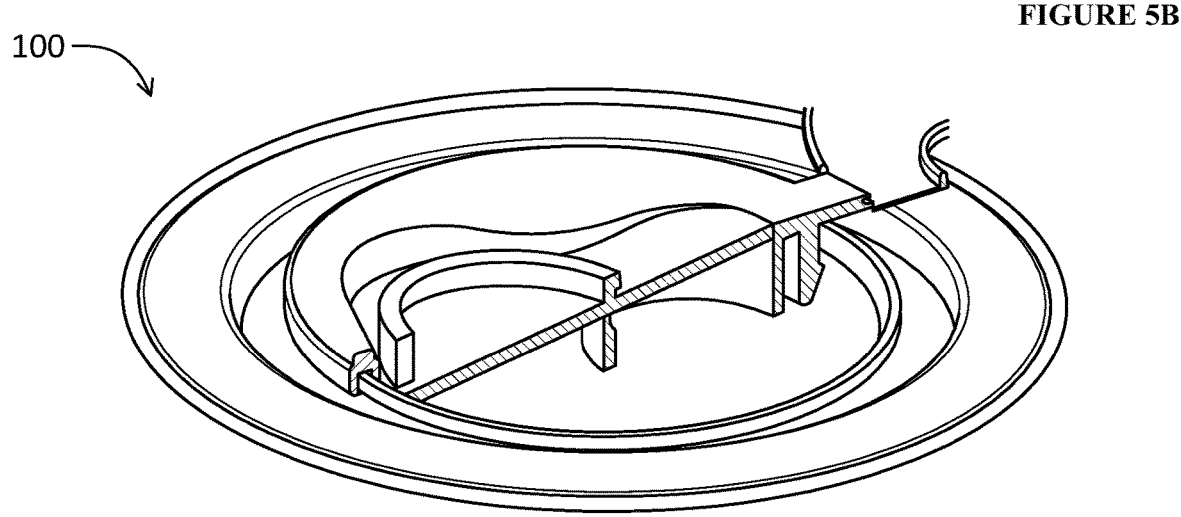
Figure 6B:
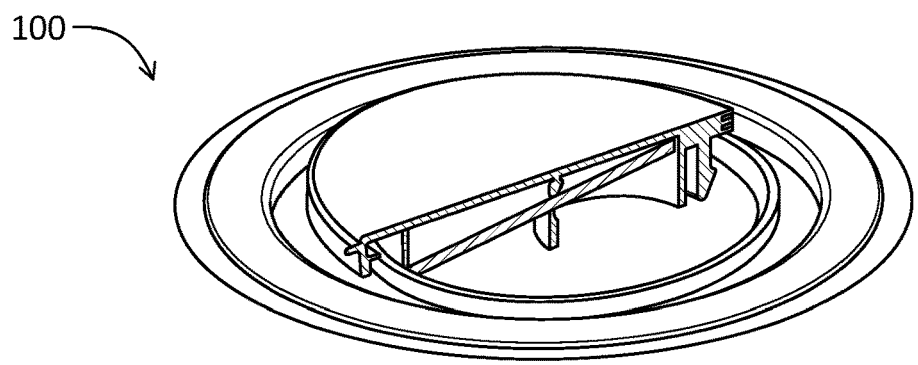
FIG. 6B is a perspective cutaway view of the embodiment of FIG. 5B but in the closed position and FIG. 6C is a side perspective view of the same.
Figure 6C:
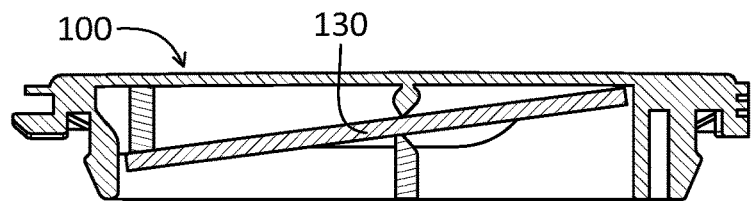

Another unique feature in some embodiments of assembly 200 relates to the orientation of the diaphragm relative to the cover panel 140 (and, by extension the plane formed by the container, previously referenced as line B in FIG. 4). With specific reference to FIGS. 6A through 6C, diaphragm 130 is positioned at an angle, relative to the horizon, of less than 45°, less than 30°, or even less than 10°. Flange section 124 then extends horizontally all the way up to the edge/interface with diaphragm 130. This arrangement better defines the pour spout and may provide a smoother pouring action. The angle might also further facilitate the removal of diaphragm 130. A central nub or stopper may be provided on panel 140 to facilitate closure and engagement when the assembly 200 is moved into a closed position.

Figure 11:
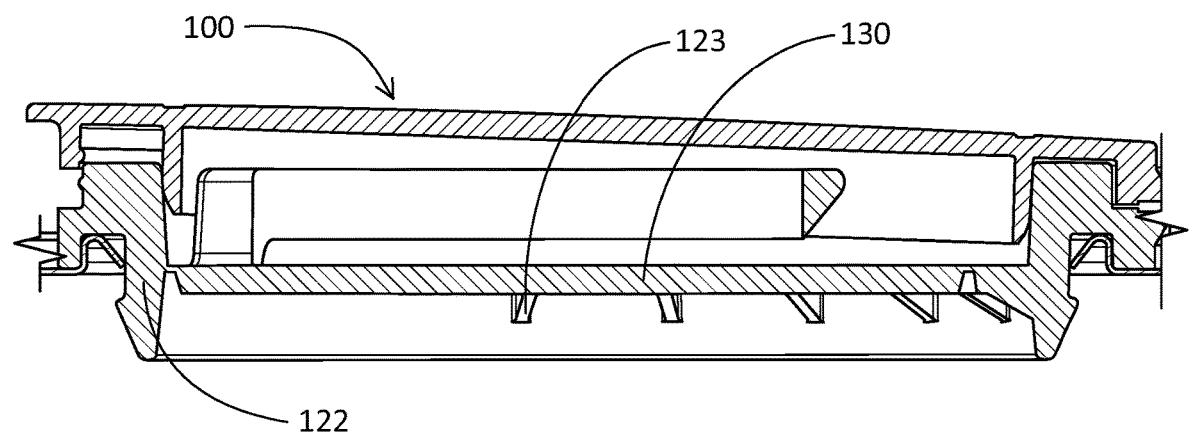
FIG. 11 is a cross sectional view of the embodiment of FIG. 8 but in the closed position.

As seen in FIG. 11, support ribs 123 could be provided along the interface between the skirt 122 and the diaphragm 130. When present, these ribs 123 should be in contact with the portion of the diaphragm 130 that remains connected to the body 120 even after the aperture is created. Ribs 123 provide further structural support, and they can be positioned regularly around the periphery of the skirt 122 or only at places where substantial horizontally planar portions of the diaphragm 130 will remain in place after the aperture is created. Ribs 123 should further also facilitate removal of the portions of diaphragm intended to remain in place.

Figure 12:
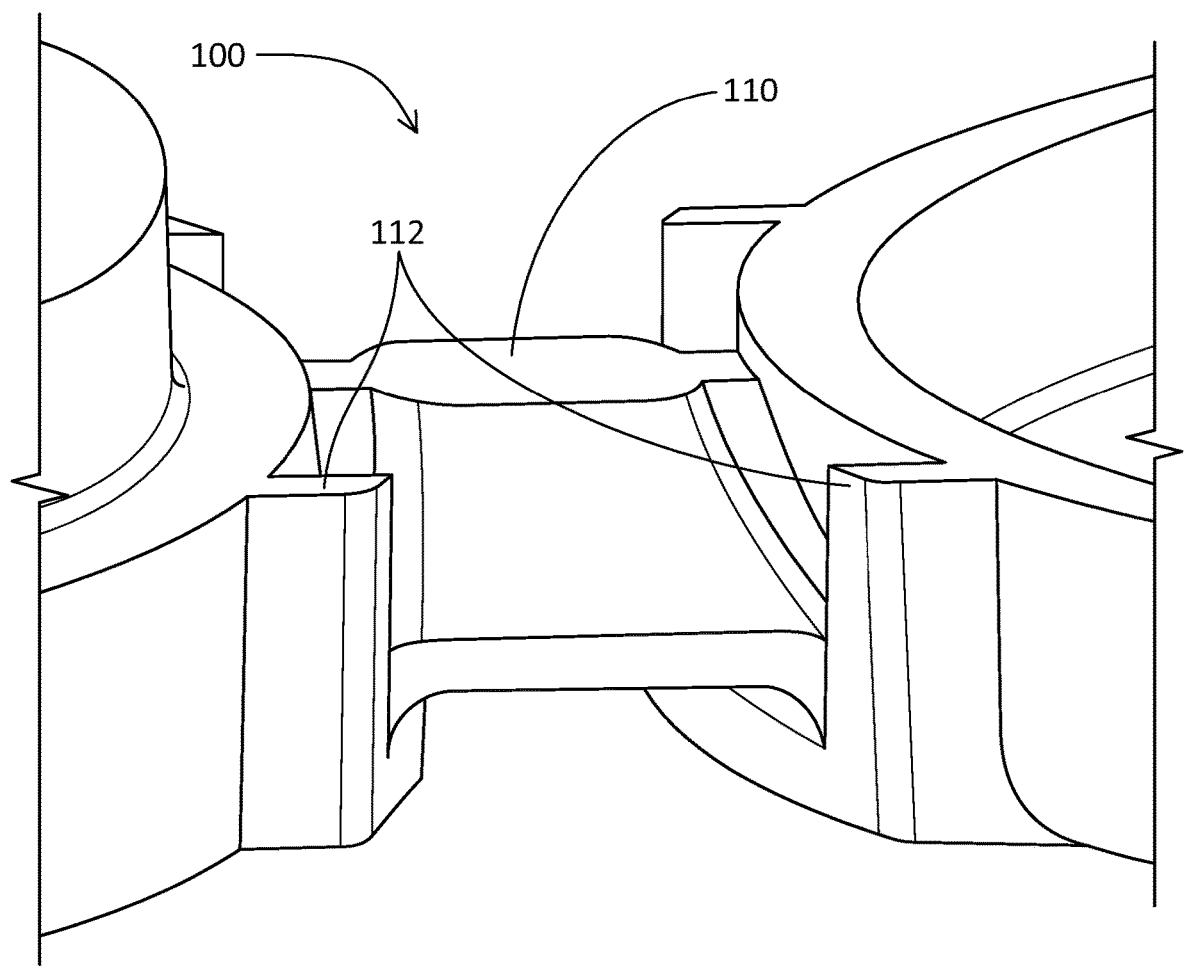
FIG. 12 is a perspective, sectional view of a hinged attachment between the top panel and the base panel, as such might be implemented in the embodiment of FIG. 8.

FIG. 12 illustrates one embodiment of the hinge portion 110 that connects an edge of the base 120 and the top panel 140. Stops 112 can be incorporating proximate the main body of the hinge to prevent over rotation. The material for hinge 110 should be sufficiently strong and resilient to allow for repeated opening and use. The material could have shape-memory characteristics to bias the part into a preferred open or closed position, or a biasing member (e.g., metal spring or clip) could be attached or embedded in the body of hinge 110 for the same purposes.

The foregoing arrangement provides for a low profile with a small axial height, relative to the closed position of the assembly as installed on a container. In one aspect, at least half of the axial height (taken along line A-A in FIG. 4) of the base 120 is positioned beneath the plane (indicated by line B) defined by the container panel in which the assembly 100 is attached (this also applies to the other aspects described above).

Any of these arrangements may be molded from low density polyethylene, although other polymeric materials can be selected based upon cost and workability along with various blends of polymers used. Advantageously, a single polymer may provide the benefit of recycling the assembly 100.

The removable diaphragms 130 also serves as evidence of tampering. That is, once the assembly 100 is inserted employed as closures, the only way to access the inside of the container is to remove the diaphragm 130. Thus, these serve as basic tamper-evident seals. Additionally or alternatively, one or more frangible elements could be provided to temporarily connect the base panel 120 a the skirt 122 and/or flange 124, as well as at the hinge panel 140. In this manner, the user must initially break these frangible elements to open the lid and/or access and remove diaphragm 130. Other tamper-evident features are also possible.

The container in these embodiments can be rigid or resilient. Ultimately, the dispensing action for the measured dose does not require any squeezing action and, instead, relies upon gravity to activate the necessary flow of fluid and air throughout the assembly.

In fact, the containers most appropriate for use in connection with the designs above provide flat facings to improve stackability and packing density. Consequently, another advantage of the aforementioned designs is that they possess a relatively low profile when affixed to containers in both the original and closed positions. That is, the top facing of the hinged panel aligns in or closely proximate to the planar surface on the top of the container, thereby allowing multiple containers to be stacked one on top of the other on pallets and/or according to other mass-shipping techniques.

Also to that end, reinforcement ribs and support members may be formed on and integrally with the panels 120, 140 so as to better distribute loads and improve the overall durability of the assemblies 100. These features also help to resist/prevent deformation and damage when the assembly 100 is subject to impact or other similar forces.

In various aspects of the invention, a resealable closure plug is contemplated having any combination of the following features:

a cylindrical base including a peripheral skirt with at least one angled engagement section at a bottom end of the skirt, said skirt further defining a central aperture with a removable diaphragm attached to an inner facing of the peripheral skirt so as to initially seal the central aperture;

a hinge portion connected to a peripheral edge of the cylindrical base at a first end of the hinge portion;

a closure panel connected to the hinge at a second end, the closure panel rotatable by way of the hinge portion between an open position and a closed position such that, in the closed position, the closure panel engages and seals the central aperture;

wherein the central aperture includes a shaped portion forming a spout;

wherein the shaped portion comprises at least one arcuate portion;

wherein the shaped portion is a continuous curved section having a larger radius in comparison to a separate curved section of the central aperture;

wherein the central aperture has a substantially circular shape;

wherein the removable diaphragm is integrally formed as part of the cylindrical base with a thinned groove or perforated line defining the central aperture and forming a shape of the removable diaphragm;

a pull tab attached to an exterior facing of the removable diaphragm;

wherein the angled engagement section is provided as a plurality of arcuate portions spaced circumferentially apart;

wherein the angled engagement section is substantially continuously provided along the bottom end of the skirt;

wherein the hinge portion includes a biasing member;

wherein the biasing member urges the closure panel into one of the open position or the closed position; and wherein the plug attaches to the container so that more than half of the plug is positioned beneath a horizontal plane defined by a panel of the container attached to the plug.

All components should be made of materials having sufficient flexibility and structural integrity, as well as a chemically inert nature. The materials should also be selected for workability, cost, and weight. In addition to the materials specifically noted above, common polymers amenable to injection molding, extrusion, or other common forming processes should have particular utility, although metals, alloys, and other composites may be used in place of or in addition to more conventional container and closure materials.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof

What is claimed is:

1. A low profile plug attachable to a container for dispensing flowable items, the plug comprising:

a cylindrical base including: (i) a peripheral skirt with at least one plug engagement section protruding radially away from a bottom end of the skirt, said plug engagement section including an angular ramp and ledge configured to prevent removal of the plug from the container, and (ii) an outer annular ledge at a top end of the skirt configured to engage the container and bear an axial load, said skirt further defining a central aperture initially sealed at the top end of the skirt by a closure panel with a removable diaphragm formed therein, said closure panel attached to an inner facing of the peripheral skirt so as to initially seal the central aperture;

a hinge portion connected to a peripheral edge of the cylindrical base at a first end of the hinge portion;

wherein the closure panel is connected to the hinge at a second end, the closure panel rotatable by way of the hinge portion between an open position and a closed position such that, in the closed position, the closure panel engages and seals the central aperture; and wherein the central aperture includes a main portion with a spout section expanding beyond a maximum diameter of the main portion so that the spout section forms a spout when the diaphragm is removed.

2. The plug of claim 1 wherein the spout section comprises a plurality of arcuate portions spaced apart and protruding out from a circle defining the main portion, each of said arcuate portions defining an individual spout.

3. The plug of claim 1 wherein the main portion is a continuous curved section having a larger radius in comparison to the spout section.

4. The plug of claim 1 wherein the main portion has a substantially circular shape.

5. The plug of claim 1 wherein the removable diaphragm is integrally formed as part of the cylindrical base with a thinned groove or perforated line defining the central aperture and forming a shape of the removable diaphragm.

6. The plug of claim 1 further comprising a pull tab attached to an exterior facing of the removable diaphragm.

7. The plug of claim 1 wherein the plug engagement section is provided as a plurality of arcuate portions spaced circumferentially apart.

8. The plug of claim 1 wherein the plug engagement section is substantially continuously provided along the bottom end of the skirt.

9. The plug of claim 1 wherein the hinge portion includes a biasing member.

10. The plug of claim 9 wherein the biasing member urges the closure panel into one of the open position or the closed position.

11. The plug of claim 1 wherein the plug attaches to the container so that more than half of the plug is positioned inside of the container and beneath a horizontal plane defined by abutting surfaces of an underside of the closure panel and a topmost panel or surface of the container.

* * * * *